United States Patent [19]
Worschech et al.

[11] Patent Number: 4,637,887
[45] Date of Patent: Jan. 20, 1987

[54] LUBRICANTS FOR VINYL CHLORIDE POLYMERS

[75] Inventors: Kurt Worschech, Loxstedt-Bexhoevede; Frido Loeffelholz, Bremerhaven-Surheide; Peter Wedl, Loxstedt-Bexhoevede; Bernd Wegemund, Haan, all of Fed. Rep. of Germany

[73] Assignee: Henkel Kommanditgesellschaft auf Aktien, Duesseldorf, Fed. Rep. of Germany

[21] Appl. No.: 739,249

[22] Filed: May 30, 1985

[30] Foreign Application Priority Data

May 30, 1984 [DE] Fed. Rep. of Germany ....... 3420226

[51] Int. Cl.$^4$ ................ C10M 129/66; C10M 129/76
[52] U.S. Cl. ............................. 252/56 R; 252/56 S; 106/38.7; 264/DIG. 79
[58] Field of Search ............................ 252/56 R, 56 S; 264/DIG. 79; 106/38.7

[56] References Cited

U.S. PATENT DOCUMENTS 3,640,828  2/1972  Brotz et al. ............................. 585/9
3,778,465  12/1973  Barnstorf ............................. 260/409

FOREIGN PATENT DOCUMENTS 0857364  11/1952  Fed. Rep. of Germany.

Primary Examiner—Jacqueline V. Howard
Attorney, Agent, or Firm—Ernest G. Szoke; Henry E. Millson, Jr.; Mark A. Greenfield

[57] ABSTRACT

Triglycerides containing hydroxy fatty acid residues, of the type obtainable by hydrogenating epoxidized natural fats and oils, are used as lubricants for the molding of polyvinyl chloride or copolymers predominantly containing vinyl chloride, and are a replacement for hardened castor oil.

10 Claims, No Drawings

LUBRICANTS FOR VINYL CHLORIDE POLYMERS

BACKGROUND OF THE INVENTION

1. Field of the Invention

This invention relates to lubricants for the molding of polyvinyl chloride and copolymers predominantly containing vinyl chloride.

2. Statement of the Related Art

In addition to stabilizers and other processing aids, lubricants are also required for the molding of polyvinyl chloride and copolymers predominantly containing vinyl chloride. Triglycerides containing 12-hydroxy stearic acid residues in the form of hardened castor oil have long been used as lubricants in the processing of rigid PVC. Molded articles which have been produced using hardened castor oil are distinguished by high surface gloss, considerable surface smoothness and minimal white fracture in the glass-clear, transparent and pigmented material. In addition, hardened castor oil can be used in relatively high concentrations without any clouding or exudation occurring (S. Riethmayer, "Gummi-Asbest-Kunststoffe" Vol. 18, 1965, page 428). By virtue of the above-mentioned properties, hardened castor oil is a sought-after lubricant for the processing of rigid PVC, above all in the manufacture of transparent to glass-clear containers for the packaging of foods and beverages.

However, the availability of natural castor oil and, therefore, the availability of hardened castor oil is subject to considerable fluctuations. Poor harvests in Brazil and India where Ricinus communis is principally cultivated lead to a shortage of the starting material for more or less long intervals. Accordingly, there is a need for a substitute for hardened castor oil which, when used as a lubricant for polyvinyl chloride and copolymers predominantly containing vinyl chloride, gives results at least as good as those obtained with the product to be replaced. Above all, the substitute should be obtainable from a more widely available, less crisis-prone raw material.

DESCRIPTION OF THE INVENTION

It has been found that triglycerides containing hydroxy fatty acid residues, obtainable by the epoxidation of fats and oils containing mono- and polyunsaturated fatty acids, followed by hydrogenating cleavage of the oxirane rings, may be used as a substitute for hardened castor oil.

Accordingly, the present invention relates to triglycerides containing hydroxy fatty acid residues, preferably obtained by hydrogenating epoxidized natural fats and oils, as a lubricant for the molding of polyvinyl chloride or copolymers predominantly containing vinyl chloride, and a method for such use.

The triglycerides used in accordance with the invention are a class of chemical compounds known per se which may be produced by conventional methods of organic synthesis. Suitable starting materials for producing the triglycerides containing hydroxy fatty acid residues are natural fats and oils of which the fatty acid content consists to a large extent of mono-and polyunsaturated fatty acids. Examples of suitable starting materials are at least one of olive oil, linseed oil, palm oil, tall oil, lard oil, herring oil and whale oil. Soybean oil, rapeseed oil and tallow, or their mixture, are particularly preferred.

The natural fats and oils are best epoxidized by the processes known from the production of epoxide plasticizers, for example by reaction with peracetic acid in the presence of acidic catalysts or with performic acid formed in situ from formic acid and hydrogen peroxide (see German Pat. No. 857,364).

The reaction conditions for the subsequent hydrogenation of the expoxidized fatty acid triglycerides should be selected in such a way that only the oxirane rings present in the fatty acid residues are split up to form an alcoholic hydroxy group, whereas the ester groups present remain intact. Suitable reaction conditions are described, for example, in U.S. Pat. No. 3,778,465 and corresponding published German patent application No. 30 21 530, according to which epoxidized fatty acid esters can be hydrogenated to form the corresponding hydroxy fatty acid esters in the presence of catalysts based on heavy metals of Group VIII of the Periodic Table at a temperature of 100° to 250° C. and under a hydrogen pressure of at least 50 atms. gauge (=51.7 bars).

Depending on the particular starting material used, the fatty acid component of the hydroxy fatty acid triglycerides produced in the described manner contains varying amounts of mono- and dihydroxy fatty acids, keto fatty acids, optionally tri- and tetrahydroxy fatty acids and, of course, the saturated fatty acids already present in the starting material. The composition of the fatty acid component varies not only in dependence upon the type of starting material selected, but also (for a given starting material) in dependence upon the origin and previous history of the fat or oil in question. For example, in the analysis of two batches of triglyceride mixtures containing hydroxy fatty acid residues which had been obtained from rapeseed oils of different origin low in erucic acid, the following values were obtained for the hydroxy and keto carboxylic acids, the percentages quoted being based on the total quantity of fatty acids present:

|  | Product I | Product II |
|---|---|---|
| Monohydroxy-$C_{18}$—carboxylic acids | 48.8 | 49.1 |
| Dihydroxy-$C_{18}$—carboxylic acids | 9.3 | 12.7 |
| Keto-$C_{18}$—carboxylic acids | 5.3 | 5.4 |

Two batches of hydroxy fatty acid triglycerides emanating from soybean oils of different origin produced the following values:

|  | Product I | Product II |
|---|---|---|
| Monohydroxy-$C_{18}$—carboxylic acids | 43.6 | 41.9 |
| Dihydroxy-$C_{18}$—carboxylic acids | 15.1 | 15.1 |
| Keto-$C_{18}$—carboxylic acids | 2.3 | 2.3 |

The analysis values of two products which had been obtained from tallows of different origin are given as further examples:

|  | Product I | Product II |
|---|---|---|
| Monohydroxy-$C_{18}$—carboxylic acids | 31.5 | 24.4 |
| Dihydroxy-$C_{18}$—carboxylic acids | 3.7 | 2.3 |
| Keto-$C_{18}$—carboxylic acids | 1.0 | 2.4 |

The triglycerides containing hydroxy fatty acid residues used in accordance with the invention are added in a quantity of from 0.3 to 3 parts by weight and preferably in a quantity of form 0.5 to 1.0 part by weight per 100 parts by weight of resin.

The lubricating effect of the hydroxy fatty acid triglycerides may be utilized in the molding of any thermoplastic polymers of which the principal constituent is vinyl chloride. The polymers in question are primarily homopolymers of vinyl chloride having K-values of from 50 to 80 and more particularly from 55 to 70 which have been obtained by emulsion, suspension and/or mass polymerization. Other suitable polymers are copolymers containing at least 50% by weight of vinyl chloride and other polymerizable monomers, such as vinyl esters, particularly vinyl acetate, methacrylates, particularly methyl methacrylate and butyl methacrylate, fumaric acid esters, optionally free crotonic acid or fumaric acid in small quantities, and also butadiene and, preferably, vinylidene chloride. The polymers may also be after-chlorinated.

In addition to the triglycerides containing hydroxy fatty acid residues used as lubricants in accordance with the invention, other additives commonly used for this purpose are generally incorporated in the thermoplastic molding compositions where this appears appropriate for the particular molding technique envisaged and for the particular application envisaged for the molded articles. Additives such as these include: stabilizers based on metal compounds, for example tin, lead, cadmium, barium, zinc and calcium compounds; costabilizers based on organic compounds, for example β-diketones, α-ketoenol esters, α-acyl lactones, substituted 1,2-dihydropyridine-3,5-dicarboxylic acids and substituted pyrroles; antioxidants, for example sterically hindered phenols; high impact modifiers; flow promoters; antistatic agents; and, optionally, plasticizers.

The triglyceride mixtures used in accordance with the invention are particularly suitable for molding compositions based on polyvinyl chloride or copolymers predominantly containing vinyl chloride which contain a combination of calcium and zinc soaps or organotin compounds as stabilizers.

It has been found that thermoplastic molding compositions based on polyvinyl chloride or copolymers predominantly containing vinyl chloride in which the triglycerides used in accordance with the invention are present as lubricants are entirely comparable in regard to static thermal stability, dynamic stability, freedom from tack and other properties during and after molding with molding compositions of the type in which hydrogenated castor oil has been incorporated as lubricant.

EXAMPLES

The following products obtained from natural fats and oils by in situ epoxidation with performic acid followed by sump-phase hydrogenation in the presence of a nickel-containing catalyst were used in Examples 1 to 6 as triglycerides containing hydroxy fatty acid residues of the type in accordance with this invention:

Product 1

Produced from rapeseed oil low in erucic acid; iodine number ≦5; hydroxyl number 145-160; acid number ≦5; saponification number 175-180.

Product 2

Produced from soybean oil; iodine number ≦5; hydroxyl number 150-165; acid number ≦5; saponification number 175-185.

Product 3

Produced from tallow; iodine number ≦5; hydroxyl number 70-90; acid number ≦5; saponification number 180-190.

Comparison product

Hardened castor oil; iodine number ≦5; hydroxyl number 150-160; acid number ≦5; saponification number 175-180.

EXAMPLE 1

PVC molding compositions A to D were obtained by mechanically mixing the following individual constituents (PBW =parts by weight):

- 100 PBW: suspension-PVC, K-value 58 ("Solvic" 258 RB)
- 10 PBW: high impact modifier based on methacrylate-butadiene-styrene copolymer ("Kane" ACE B 28),
- 1 PBW: flow modifier based on methacrylic acid ester ("Paraloid" K 125),
- 5 PBW: calcium stearate,
- 0.2 PBW: zinc octoate,
- 0.2 PBW: complex ester of adipic acid, pentaerythritol and stearic acid in a molar ratio of 6:7:16; hydroxyl number approx. 2; acid number approx. 10,
- 0.2 PBW: distearoyl methane,
- 5 PBW: epoxidized soya oil,
- 1.5 PBW: LUBRICANT.

Products 1, 2 and 3 were used as lubricants in molding compositions A, B and C, the comparison product being used in molding composition D.

The polyvinyl chloride molding compositions obtained were processed for 5 minutes on "Berstorff" laboratory mixing rolls measuring 450×220 mm rotating in the same direction (roll temperature 170° C., roll speed 12.5 r.p.m.) to form test sheets. To test the static thermal stability of the PVC molding compositions, the approx. 0.5 mm thick sheets were cut into square test specimens having an edge length of 10 mm which were subsequently exposed to a temperature of 180° C. in a drying chamber having 6 rotating shelves ("Heraeus" FT 420 R). Test specimens were removed at 15 minute intervals and inspected for changes in color.

In Table 1 below, the period of time after which the specimen showed distinct discoloration is shown under "initial stability" for each molding composition. The period of time after which the test had to be terminated because of excessive discoloration is shown under "stability failure". Before the beginning of the heat treatment, all the test specimens were very pale yellow in color.

TABLE 1

Static thermal stability of molding compositions A to D

| Molding Composition | Lubricant | Initial stability (mins.) | Stability failure (mins.) |
|---|---|---|---|
| A | product 1 | 30 | 120 |
| B | product 2 | 45 | 105 |
| C | product 3 | 30 | 105-120 |
| D | comparison | 30-45 | 105 |

TABLE 1-continued

| Static thermal stability of molding compositions A to D | | | |
|---|---|---|---|
| Molding Composition | Lubricant | Initial stability (mins.) | Stability failure (mins.) |
| | product | | |

EXAMPLE 2

PVC molding compositions E, F and G were obtained by mechanically mixing the following individual constituents (PBW=parts by weight):

- 100 PBW: suspension PVC, K-value 58 ("Solvic" 258 RB)
- 10 PBW: high impact modifier based on a methacrylate-butadiene-styrene copolymer ("Kane" ACE B-28)
- 1 PBW: flow modifier based on methacrylic acid ester ("Paraloid" K 125)
- 1.5 PBW: dioctyl tin mercaptide ("Irgastab" 17 MOK)
- 0.5 PBW: complex ester of adipic acid, pentaerythritol and stearic acid in a molar ratio of 6:7:16; hydroxyl number approx. 2; acid number approx. 10,
- 0.75 PBW: glycerine monohydroxy stearate
- 0.75 PBW: LUBRICANT.

Products 1 and 2 were used as lubricants in molding compositions E and F, the comparison product being used in molding composition G.

The static thermal stability of the molding compositions obtained was tested by the method described in Example 1. The results obtained are shown in Table 2 below. Before the beginning of the heat treatment, all the test specimens were colorless.

TABLE 2

| Static thermal stability of molding compositions E to G | | | |
|---|---|---|---|
| Molding Composition | Lubricant | Initial stability (mins.) | Stability failure (mins.) |
| E | product 1 | 75 | 150 |
| F | product 2 | 75 | 150 |
| G | comparison product | 75 | 150 |

EXAMPLE 3

In order to determine freedom from tack, quantities of 220 g of molding compositions A to D described in Example 1 were rolled out to form a continuous sheet around the mixing rolls described in Example 1 (roll temperature 200° C.) and the sheet further processed until the molding composition adhered firmly to the surface of a roll. The gap width between the rolls was adjusted in such a way that the thickness of the encircling sheet amounted to 0.5 mm.

The period of time after which the test specimens, which were all very pale yellow at the start, showed the first signs of discoloration (initial stability) and then the tack-free time are shown for each molding composition in Table 3 below.

TABLE 3

| Freedom from tack of molding compositions A to D at 200° C. | | | |
|---|---|---|---|
| Molding Compositions | Lubricant | Initial stability (mins.) | Tack free after (mins.) |
| A | product 1 | 6 | 16 |
| B | product 2 | 8 | 14 |
| C | product 3 | 6 | 18 |
| D | comparison product | 8 | 14 |

EXAMPLE 4

The freedom from tack of molding compositons E to G of Example 2 was determined at 200° C. by the method described in Example 3. The results obtained are shown in Table 4 below. The period of time after which the molding compositions, which were all colorless at the start, showed the first signs of discoloration is indicated in column 3.

TABLE 4

| Freedom from tack of molding compositions E to G at 200° C. | | | |
|---|---|---|---|
| Molding Compositions | Lubricant | Initial stability (mins.) | Tack free after (mins.) |
| E | product 1 | 26 | 26 |
| F | product 2 | 24 | 24 |
| G | comparison product | 26 | 44 |

EXAMPLE 5

Dynamic stability and minimal kneading resistance were determined using a plastograph ("Brabender" PL 151 Plasticorder; see P. Klenk "Der Plastverarbeiter", Vol. 21, 1970/7, pages 642–644). The chamber temperature was 190° C. and the rotational speed 40 r.p.m. The tests were carried out on batches of 32 g of molding compositions A to D of Example 1.

In addition to the period of time after which the test had to be terminated because of excessive discoloration (stability failure), the minima of the kneading resistance and the melt temperature observed during the test are shown in the following Table.

TABLE 5

| Dynamic stability of molding compositions A to D | | | | |
|---|---|---|---|---|
| Molding Composition | Lubricant | Stability failure | Min. kneading resistance (Nm sec$^{-1}$) | Min. melt temp. (°C.) |
| A | product 1 | 22.0 | 5.4 | 198.5 |
| B | product 2 | 18.4 | 5.3 | 199.0 |
| C | product 3 | 20.9 | 5.3 | 199.0 |
| D | comparison product | 21.3 | 5.3 | 199.0 |

EXAMPLE 6

The dynamic stability and minimal kneading resistance of molding compositions E to G of Example 2 were determined by the method described in Example 5. The results obtained are shown in Table 6 below.

TABLE 6

| Dynamic stability of molding compositions E to G | | | | |
|---|---|---|---|---|
| Molding Composition | Lubricant | Stability failure | Min. kneading resistance (Nm sec$^{-1}$) | Min. melt temp. (°C.) |
| E | product 1 | 20.2 | 5.4 | 199.0 |
| F | product 2 | 19.2 | 5.3 | 200.0 |

TABLE 6-continued

| Molding Composition | Lubricant | Stability failure | Min. kneading resistance (Nm sec$^{-1}$) | Min. melt temp. (°C.) |
|---|---|---|---|---|
| G | comparison product | 18.6 | 5.4 | 199.0 |

"Solvic" is a trademark of Solvay & Cie S.A., Brussels, Belgium
"Kane" is a trademark of Kanegafuchi Chemical Ltd., Osaka, Japan
"Paraloid" is a trademark of Rohm & Haas Comp., Philadelphia, Pa.
"Irgastab" is a trademark of Ciba-Geigy AG, Basel, Switzerland

We claim:

1. In the process of molding polyvinyl chloride or copolymers predominantly containing vinyl chloride wherein a molding lubricant is employed, the improvement comprising using a lubrication effective amount of a molding lubricant consisting essentially of triglycerides containing hydroxy fatty acid residues obtained by hydrogenating at least one epoxidized natural fat or oil selected from olive oil, linseed oil, sunflower oil, safflower oil, peanut oil, corn oil, palm oil, tall oil, lard oil, herring oil, whale oil, soybean oil, rapeseed oil, or tallow.

2. The process of claim 1 wherein said natural fat or oil is soybean oil, rapeseed oil, tallow, or any mixutre thereof.

3. The process of claim 1 wherein said triglycerides are used in a quantity of about 0.3 to 3.0 parts by weight per 100 parts by weight of said polymers or copolymers.

4. The process of claim 2 wherein said triglycerides are used in a quantity of about 0.3 to 3.0 parts by weight per 100 parts by weight of said polymers or copolymers.

5. The process of claim 1 wherein said triglycerides are used in a quantity of about 0.5 to 1.0 part by weight per 100 parts by weight of said polymers or copolymers.

6. The process of claim 2 wherein said triglycerides are used in a quantity of about 0.5 to 1.0 part by weight per 100 parts by weight of said polymes or copolymers.

7. A molding composition comprising polyvinyl chloride or copolymers predominantly containing vinyl chloride and about 0.3 to about 3.0 parts by weight per 100 parts by weight of said polyvinyl chloride or copolymers of a molding lubricant consisting essentially of trigylcerides containing hydroxy fatty acid residues obtained from the hydrogenation of at least one epoxidized natural fat or oil selected from olive oil, linseed oil, sunflower oil, safflower oil, peanut oil, corn oil, palm oil, tall oil, lard oil, herring oil, whale oil, soybean oil, rapeseed oil, or tallow.

8. The composition of claim 7 wherein said natural fat or oil is soybean oil, rapeseed oil, tallow or any mixture thereof.

9. The composition of claim 7 wherein said triglycerides are present in a quantity of about 0.5 to about 0.1 part by weight per 100 parts by weight of said polyvinyl chloride or copolymer.

10. The composition of claim 8 wherein said triglycerides are present in a quantity of about 0.5 to about 0.1 part by weight per 100 parts by weight of said polyvinyl chloride or copolymer.

* * * * *